US009020080B2

(12) United States Patent
Wasiewicz et al.

(10) Patent No.: US 9,020,080 B2
(45) Date of Patent: *Apr. 28, 2015

(54) METHOD AND SYSTEM TO ADAPTIVELY CANCEL SINUSOIDAL INTERFERENCE FROM A SIGNAL PROCESSING SYSTEM

(75) Inventors: Richard Wasiewicz, Tully, NY (US); Thomas M. Parks, Hamilton, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 178 days.

This patent is subject to a terminal disclaimer.

(21) Appl. No.: 13/162,346

(22) Filed: Jun. 16, 2011

(65) Prior Publication Data

US 2012/0321024 A1 Dec. 20, 2012

(51) Int. Cl.

| H03D 1/04 | (2006.01) |
|---|---|
| H03D 1/06 | (2006.01) |
| H03K 5/01 | (2006.01) |
| H03K 6/04 | (2006.01) |
| H04B 1/10 | (2006.01) |
| H04L 1/00 | (2006.01) |
| H04L 25/08 | (2006.01) |
| H04B 15/04 | (2006.01) |

(52) U.S. Cl.
CPC ..................................... *H04B 15/04* (2013.01)

(58) Field of Classification Search
USPC ......................................... 375/316, 324, 346
See application file for complete search history.

(56) References Cited

U.S. PATENT DOCUMENTS

| 4,853,903 | A | 8/1989 | Linville, Jr. et al. | |
|---|---|---|---|---|
| 5,051,963 | A | 9/1991 | Linville, Jr. et al. | |
| 7,453,963 | B2* | 11/2008 | Joublin et al. | 375/346 |
| 7,492,668 | B2* | 2/2009 | Chang et al. | 367/137 |
| 7,840,384 | B2* | 11/2010 | Feldhaus et al. | 702/191 |
| 2005/0207585 | A1* | 9/2005 | Christoph | 381/71.11 |
| 2007/0112573 | A1* | 5/2007 | Gerrits et al. | 704/501 |
| 2010/0034219 | A1* | 2/2010 | Stadelmeier et al. | 370/478 |
| 2010/0177857 | A1* | 7/2010 | Huttunen et al. | 375/350 |
| 2010/0296568 | A1* | 11/2010 | Bury | 375/227 |

OTHER PUBLICATIONS

Kumaravel, N. and Nithiyanandam, N., "Genetic-algorithm cancellation of sinusoidal powerline interference in electocardiograms", Journal: Medical & Biological Engineering & Computing, Mar. 1998;36(2):191-6.
So, H.C., "A Novel Adaptive Algorithm for Sinusoidal Interference Cancellation", Department of Electric Engineering, pp. 1-8, Oct. 14, 1997.
International Search Report dated Sep. 24, 2012, for International Application No. PCT/US12/42496.

(Continued)

*Primary Examiner* — Freshten N Aghdam
(74) *Attorney, Agent, or Firm* — Howard IP Law Group, PC

(57) ABSTRACT

A method of canceling sinusoidal interference from a received signal includes identifying a block of signal-free data containing sinusoidal interference. A model of the significant interference in the selected data block is constructed, scaled to subsequent data blocks and used to remove sinusoidal interference signals from the overall received signal.

20 Claims, 13 Drawing Sheets

(56) References Cited

OTHER PUBLICATIONS

North, Richard C., Zeidler, James R., Albert, Terrance R., Ku, Walter H., "Comparison of Adaptive Lattice Filters to LMS Transversal Filters For Sinusoidal Cancellation", IEEE, pp. IV-33-IV-36, 1992.

Xu, Lijun and Yan, Yong, "Wavelet-based removal of sinusoidal interference from a signal", Measurement Science Technology, 15 (2004), 1779-1786.

So, H.C., "Adaptive cancellation of multiple interfering sinusoids", Electronics Letters, vol. 34, No. 24, Nov. 26, 1998.

\* cited by examiner

METHOD AND SYSTEM TO ADAPTIVELY CANCEL SINUSOIDAL INTERFERENCE FROM A SIGNAL PROCESSING SYSTEM

FIELD OF THE INVENTION

The present invention relates to signal processing, and more specifically to methods of reducing interference in a signal.

BACKGROUND

The ability to provide long-distance wireless communication in dangerous and/or obstructed environments, for example in underground mines, is essential for both efficient operation and safety. In some applications, such as coal mining, communications systems are required by regulations for post-accident communications. In these mining operations, transmitting communication signals through earth, water and rock, for example, in addition to the large amounts of steel and concrete used in associated structures, severely impact the effective range of a communications signal. This is especially true with systems transmitting radio frequency signals through, for example, conventional electric dipole antennas.

Magnetic communications systems (MCSs) that provide low-frequency magnetic signals offer an increased ability to transmit through these materials. For example, a MCS may be used to provide emergency communication between a site deep within an underground mine and a second distant site, either on the surface or also within the mine. These systems typically operate with relatively weak signals and severe interference as a result of above-described interferences, both natural and manmade. This interference limits the ability of the MCS receiver to detect and demodulate the underlying signal, limiting the system's effective range as a result. Improved methods to eliminate or reduce these interferences are therefore desired.

SUMMARY

An embodiment of the present invention comprises a method of canceling sinusoidal interference from a received signal. The method includes identifying a data block containing data samples that are known to be signal-free but which contain sinusoidal interference. Through a training process, a model of the average interference in the selected data block is constructed. The constructed model is scaled to subsequent data blocks and used to cancel sinusoidal interference from the received signal with minimal perturbation to the underlying desired data signal.

Another embodiment of the present invention includes a signal processing system. The system receives a signal, such as a magnetic communications signal, containing data as well as sinusoidal interference. The received signal is digitally sampled and the samples are processed by a digital signal processor. The digital signal processor includes an interference cancellation module configured to construct a model of the average interference, scale the model to a data block being processed and subtract the scaled model from the digital samples to remove the interference with minimal effect to the underlying data signal.

DETAILED DESCRIPTION

Figure 1A:
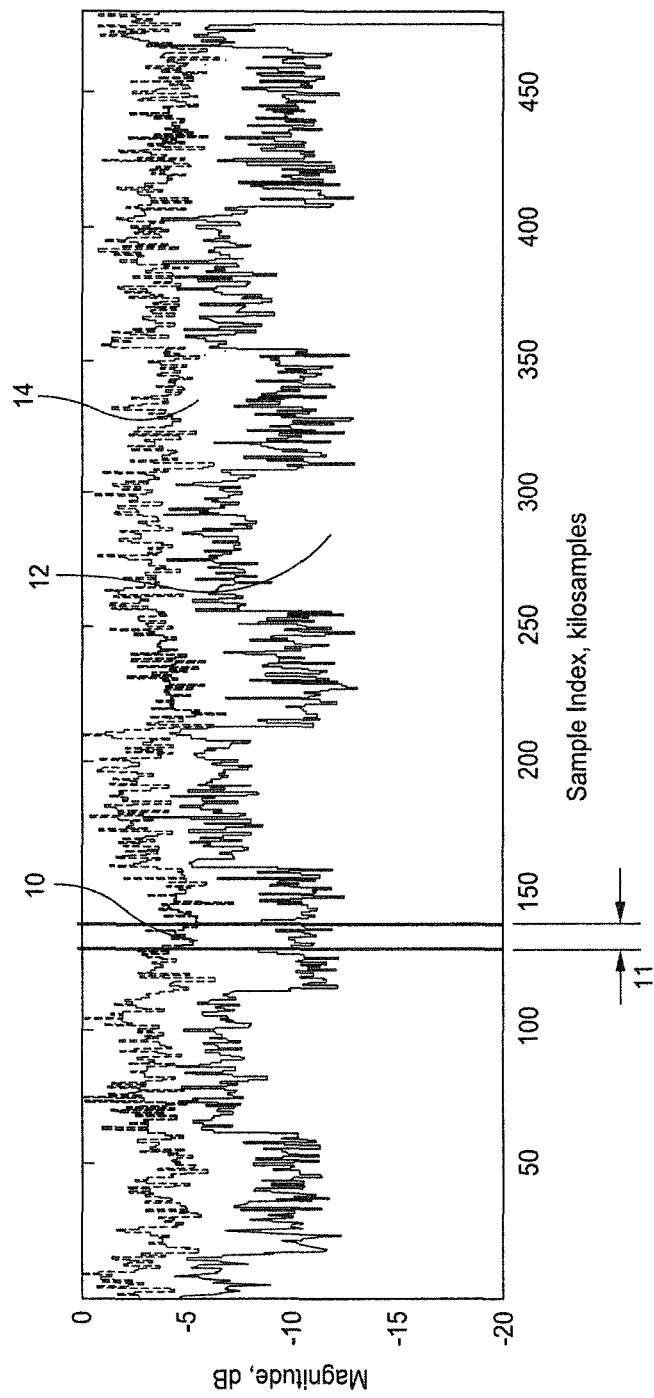
FIGS. 1A and 1B are graphs of an exemplary data signal containing both data and sinusoidal interference overlaid with a signal resulting from an applied interference cancellation process according to embodiments of the present invention.

It is to be understood that the figures and descriptions of the present invention have been simplified to illustrate elements that are relevant for a clear understanding of the present invention, while eliminating, for purposes of clarity, many other elements found in typical signal processing systems, such as underground communication systems. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

The study of transmitted signals, for example, magnetic communication signals, has shown that in some environments, a significant component of the interference contained therein is periodic in nature. These oscillating components may be caused by magnetic field emissions from rotating electrical machinery, digital electronic equipment, power lines and other unidentified sources. For example, within the narrow MCS passband, this periodic interference may appear as a truncated sequence of harmonics operating at one or more fundamental frequencies. Accordingly, the interference may be modeled as a superposition of multiple discrete, amplitude-diverse and phase-diverse sinusoids onto the underlying communications signal. Further, additional sinusoidal interferences have been observed with no harmonic relationship to one another.

Embodiments described herein may be operative to identify these sinusoids and their operating frequencies, and adaptively cancel them with minimal harm to the relatively weak data (e.g. communications) signal sharing the band. The embodiments may also adaptively subtract sinusoids of known frequencies, such as harmonics of 60 Hz caused by power systems, that are typically present in the magnetic signal domain. The embodiments include a training process operative to adaptively learn the frequencies, amplitudes and phases of the interfering sinusoids. Using this data, a model of the net interference signal is created. This model may be subtracted from the received data stream to remove interference while minimizing damage to the underlying signal.

Figure 1B:
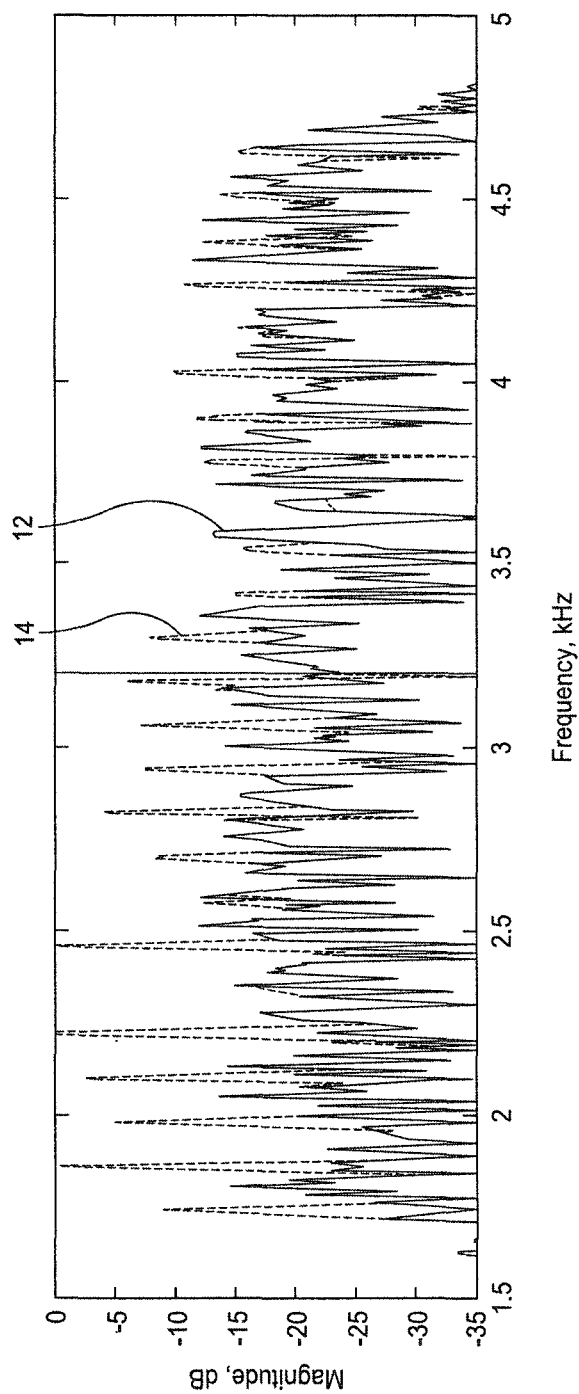

Referring generally to FIGS. 1A and 1B, exemplary graphs of a sampled data signal in the time (FIG. 1A) and frequency (FIG. 1B) domain are provided. The signal 10 is comprised of a data signal portion 12 and an interference portion 14 (see the signal of sample period 11). Interference 14 includes the above-described sinusoidal interference common to, for example, magnetic communications signals. Embodiments of the present invention may be utilized to reduce or eliminate this interference portion 14.

Figure 2:
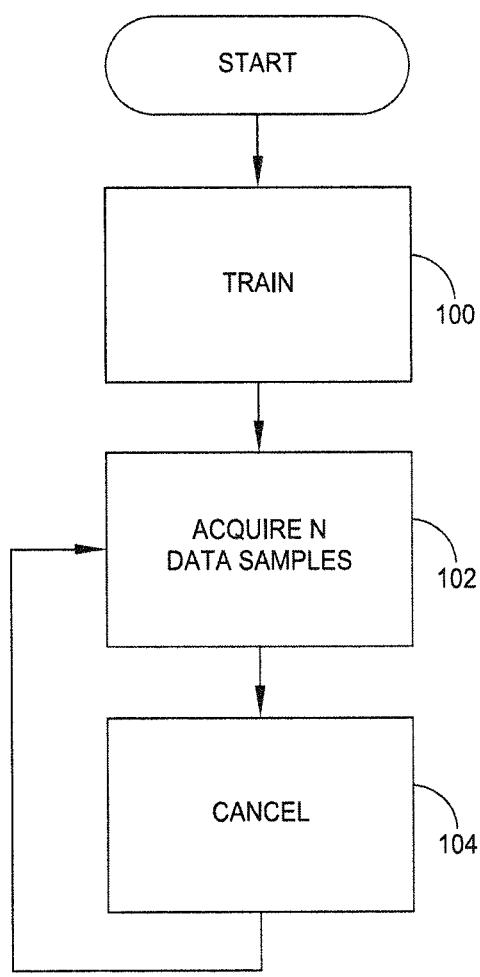
FIG. 2 is a process flow diagram of an embodiment of the present invention used to perform the interference cancelation illustrated in FIGS. 1A and 1B.

With reference to FIG. 2, methods to cancel this sinusoidal interference from a signal include the use of a multi-step process. The first step 100 includes a training operation used to compile a list of frequencies at which the sinusoidal interference has been identified. From this information, a model of the interference is generated. At step 102, a number N of data samples comprising both interference and signal data may be taken from the received signal. Finally, in step 104 each identified sinusoidal frequency is canceled by subtracting the model from the sampled data. This cancellation process may be repeated for subsequent data samples. In one embodiment of the present invention, the cancellation process is performed on all received data, while the training process is performed less frequently.

Figure 3:
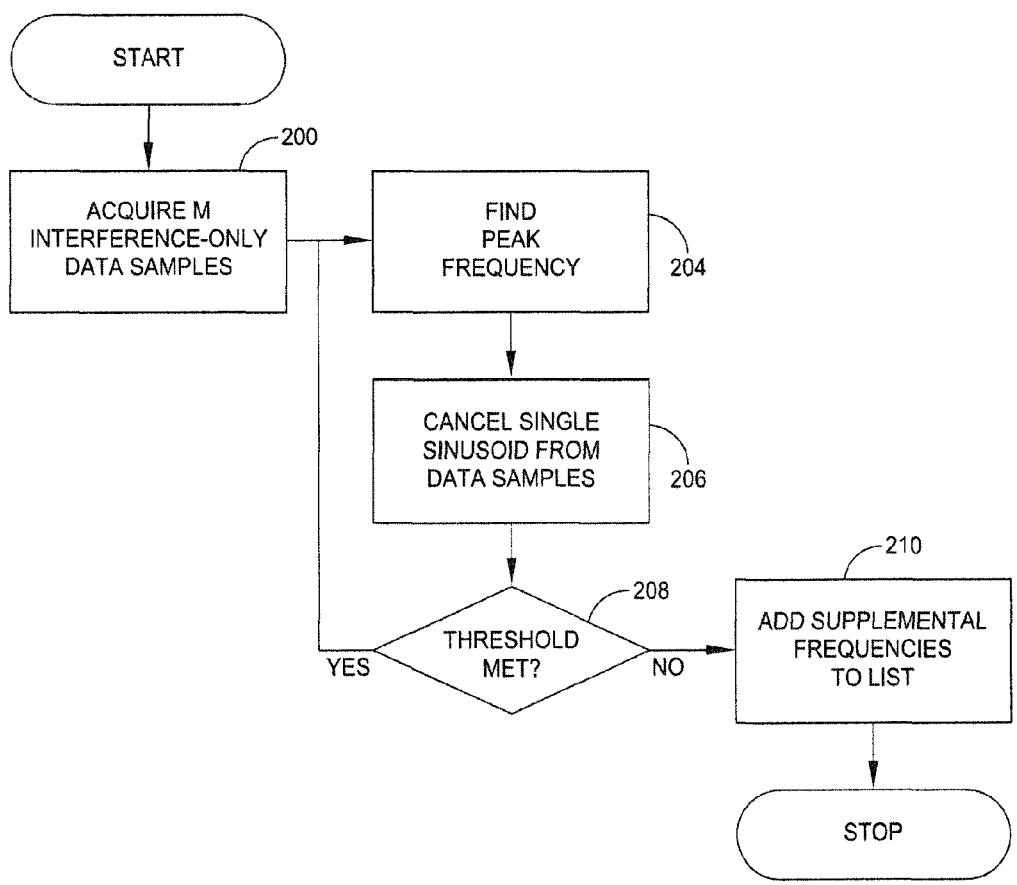
FIG. 3 is a process flow diagram of an exemplary training process according to an embodiment of the present invention.

Referring generally to FIG. 3, a more detailed view of the training process of FIG. 2 is shown. In step 200, a block of training data comprising, for example, M interference-only data samples, is acquired. The spectrum of this data is analyzed to find the frequency of the sinusoid with the maximum amplitude in step 204. This sinusoid is then canceled from the data in step 206. Referring generally to step 208, once canceled, the net power of the data block is then determined and compared to a threshold value. If the net power of the selected data block (which is known not to contain a desired signal) is above a predetermined threshold, the high net power level indicates that there are still components of the data block which are interference, causing net power increase in the data block. These remaining interference signals are iteratively removed by identifying the next largest amplitude. Thus, peak frequency identification (step 204) and cancellation (step 206) are repeated until the power of the data decreases by an amount less than the predetermined threshold. Each iteration of spectrum analysis is free from contamination from frequency sidelobes of the stronger sinusoids that have previously been identified and removed from the data. Finally, in step 210, a list of frequencies of the strongest sources of the interference is assembled. In one embodiment, this list may be supplemented with additional frequencies not identified by the above-described process (e.g. harmonics of 60 Hz) to remove interference from known sources, such as power generators.

Figure 4:
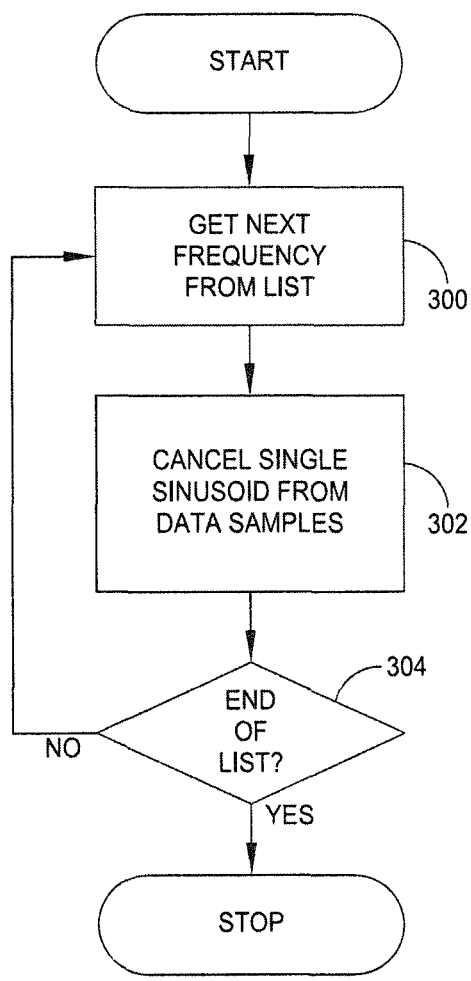
FIG. 4 is a process flow diagram of an exemplary iterative cancellation process according to an embodiment of the present invention.

Referring again to FIG. 2, the cancellation process can be embodied in several ways. By way of non-limiting example only, and with reference to FIG. 4, the cancellation process may be iterative, wherein individual sinusoid frequencies identified during the above-described training process are removed from the data one at a time. More specifically, at step 300, the frequency list generated above may be accessed, the first frequency identified, and single sinusoids of the identified frequency cancelled from the data (step 302). At step 304, if the list contains additional frequencies, the process returns to step 300, and repeats until sinusoids of each frequency on the list are cancelled.

Figure 5:
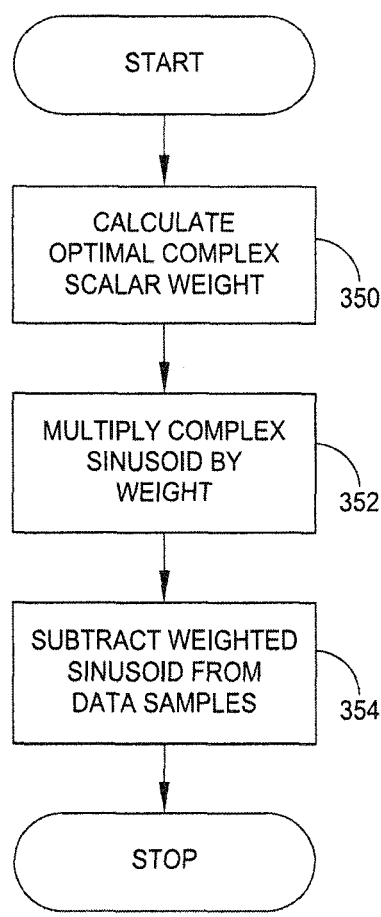
FIG. 5 is a process flow diagram of an exemplary single sinusoid cancellation process according to an embodiment of the present invention.

A more detailed process diagram of an embodiment of the cancellation process is shown in FIG. 5. Referring generally to step 350, this process includes calculating optimal complex scalar weights from the identified sinusoids. In one embodiment, a complex sinusoid of a specified frequency is projected onto a block of data samples to produce a complex scalar weight. This weight is indicative of the amplitude and the phase that produces the best fit, for example, in a least-squares analysis, between the complex sinusoid and the block of data samples. In step 352, the complex sinusoid is multiplied by the calculated weight, and the result subtracted from the block of data samples in step 354. As set forth above, this process may be repeated for all identified frequencies of sinusoidal interference.

Figure 6:
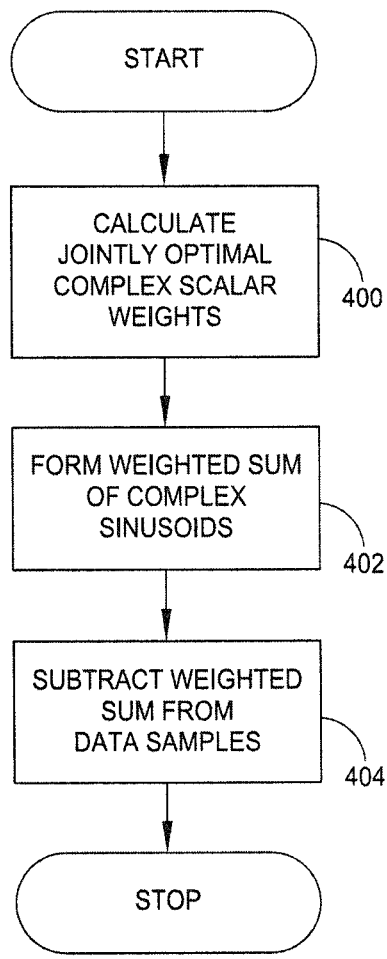
FIG. 6 is a process flow diagram of an exemplary joint cancellation process according to an embodiment of the present invention.

Referring generally to FIG. 6, the cancellation process also may be implemented as a joint process, with a weighted sum of complex sinusoids used to cancel interference from the data, in place of individual frequencies canceled one at a time as described above with respect to FIG. 4. Referring generally to step 400, this process includes calculating optimal complex scalar weights from the identified sinusoids. More specifically, given that M significant sinusoids have been identified in the above-described training process, an M×N matrix of complex unit-amplitude sinusoid signals with the mth column (m=1, 2 . . . M) represents N samples of a sinusoid at one of the M frequencies is generated. The cancellation process scales each of the matrix columns with a unique complex weight where the M weights are jointly computed such that the weighted sum of the columns best fits the first N signal plus interference samples in the least means square sense. In some cases where the interference consists of a small number of sinusoids at well-separated frequencies, the individual columns of the sinusoid sample matrix can be adaptively weighted and subtracted from the data to simplify processing. Although the joint computation of the M adaptive weights requires more computations than this simplified process, it may be preferable in some instances as it may provide better cancellation in dense interference environments. Computing these weights may be achieved by, for example, projecting the sinusoid sample matrix onto the N samples, and estimating M complex weights such that a best match is achieved. These weights are then applied to the columns of the sinusoid sample matrix, generating a weighted sum (step 402).

With reference to step 404, this weighted sum representation of N sinusoid samples is then subtracted, sample by sample, from the first N signal plus interference samples, reducing and/or cancelling the sinusoidal interference from the first N samples. The cancellation process is then repeated for the N samples indexed from N+1 through 2N, the N samples indexed from 2N+1 through 3N, and so on, with each cancellation operation using the original M×N sinusoid sample matrix. In one embodiment, the adaptive weights are recomputed from data block to data block based on samples from each block.

Figure 7:
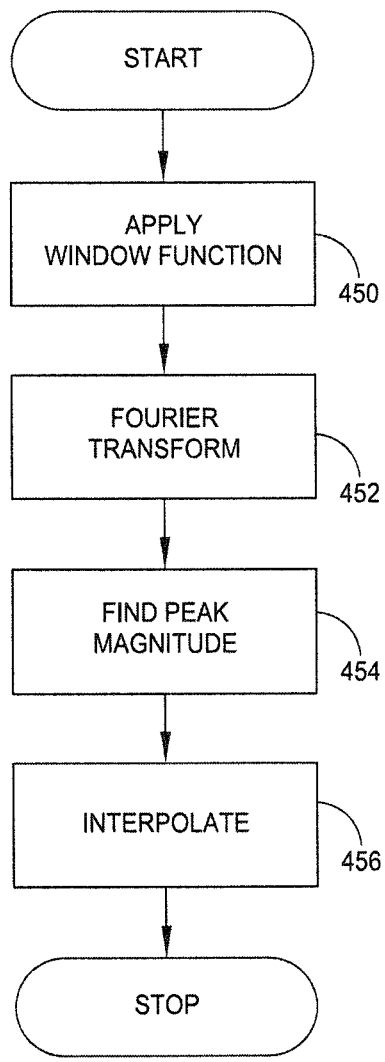
FIG. 7 is a process flow diagram of a frequency peak finding process useful for performing the training and cancellation processes of the present invention.

FIG. 7 is a process diagram illustrating a frequency peak finding process useful, for example, in performing step 204 of the training process of FIG. 3. Referring generally to step 450, a window function is applied to each block of data samples. The function may comprise a simple rectangular or triangular window, or may comprise more sophisticated functions, by way of non-limiting example only, a raised cosine. The window function may be applied to reduce unwanted effects, such as frequency sidelobes caused by discontinuities at the boundaries of the sample blocks. In one embodiment, a zero-padding operation may be applied to the data block in order to facilitate improved frequency peak identification after the application of a Fourier Transform performed to convert the data from the time domain to the frequency domain (step 452). As will be understood by one of ordinary skill in the art, zero-padding includes appending an array of zeros to the beginning or end of an input signal before applying the transform. In this way, the efficiency of the Fourier Transform algorithm may be improved by increasing the number of frequency-domain signal samples. Once in the frequency domain, the peak frequency may be identified in step 454. The peak frequency may be determined with greater accuracy by implementing interpolation methods (e.g. zero-padding, quadratic fit or other algorithms) in step 456.

Figure 8:
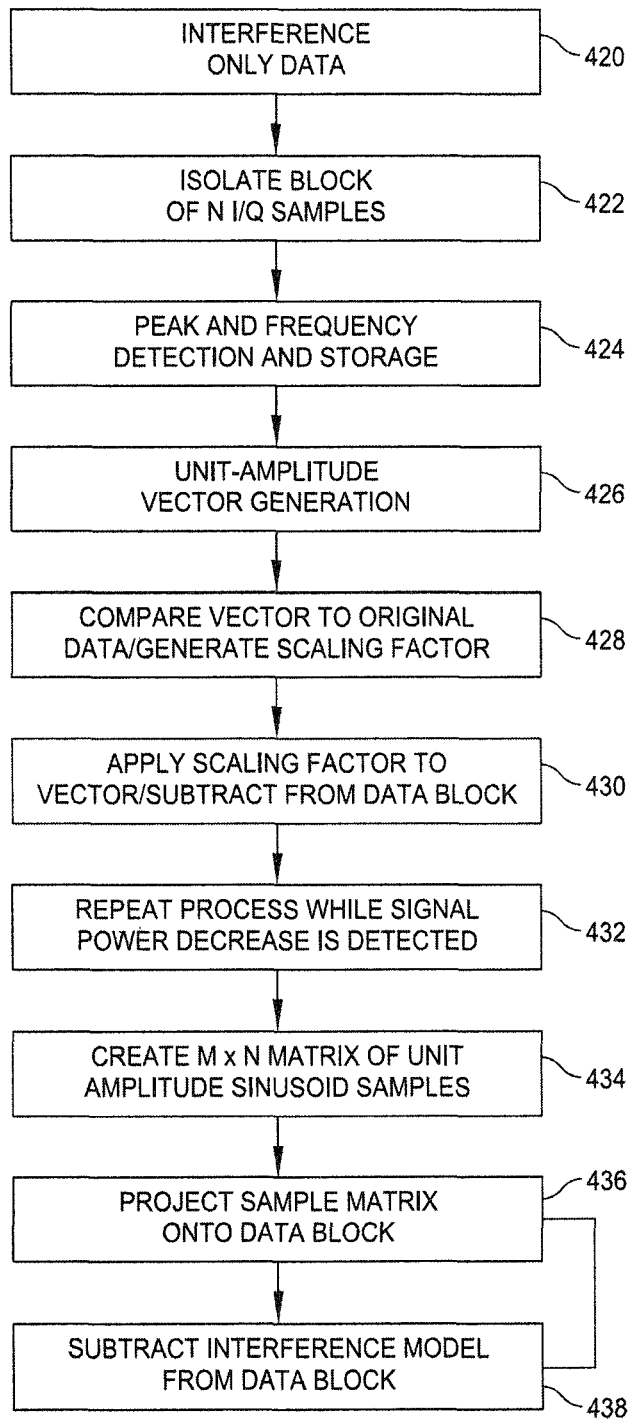
FIG. 8 is a process flow diagram of a training and cancellation process according to an embodiment of the present invention.

FIG. 8 is a process flow diagram of an exemplary cancellation process implementing several of the signal processing techniques described above with respect to FIGS. 2-7. In step 420 of the exemplary embodiment, data known to comprise interference-only is selected from the received signal. In step 422, a block of N I/Q samples which is known to be signal-free, is isolated for subsequent analysis. The samples may be processed according to any number of operations. For example, an amplitude taper filter may be applied to the samples to reduce the effects of the data block's edges. The samples may be converted from the time-domain to the frequency-domain using, for example, a Fast Fourier Transform (FFT). The FFT may provide a zero-padding function as set forth above with respect to FIG. 7.

Referring generally to step 424, each of the frequency-domain samples may be compared to identify the sample having the maximum amplitude. This sample will be analyzed to determine its frequency. In one embodiment two neighboring complex samples are jointly analyzed with the maximum amplitude sample to better estimate the frequency of the sinusoid that resulted in the observed peak. The frequency may be determined by any suitable methods. As set forth above, these methods include zero-padding the original time-domain data to increase the FFT size such that extra frequency-domain samples are interleaved between the samples corresponding to no zero-padding. The algorithm may then select the sample corresponding to a spectral peak. In another embodiment, a quadratic fit algorithm may be used to provide improved frequency accuracy beyond the FFT resolution. It is noted that the quadratic fit algorithm is mostly computed off-line. More specifically, the algorithm may determine two weights offline and form its frequency estimate as the weighted sum of the amplitudes corresponding to the identified frequency peaks and its two adjacent neighbors. It should be understood that this process is generally linear, and the term "quadratic" refers to the fact that the process is equivalent to fitting a parabola to the peak and two neighbors and then finding the frequency corresponding to the parabola's peak. Other methods, such as maximum likelihood estimation, may be used without departing from the scope of the present invention.

At step 426, once the frequency has been estimated for the largest amplitude frequency-domain sample, a vector containing N time-domain samples of a complex unit-amplitude sinusoid is created at the identified frequency. At step 428, this unit-amplitude vector may be scaled to fit each of the original N time-domain samples. Specifically, the vector may be projected onto the original sample (i.e. compared thereto), and a complex scale factor generated that best fits the amplitude and phase of the vector to the sample. This scale factor may be created by, for example, a least-mean-square algorithm.

At step 430, the calculated scale factor is applied to the unit-amplitude vector, and subsequently subtracted from the original N samples. At step 432, in order to determine the power of any remaining interference, the net power of the resulting signal is estimated. If this power is at least D dB (D being a predetermined threshold) less than an originally measured power, then the sinusoid is considered to be a significant component of interference and its estimated frequency is stored for future processing.

This process may be repeated with each iteration operating on the N time-domain signal samples from which the significant sinusoids from all previous iterations have been subtracted. Thus, as each step searches for an interfering sinusoid, it does so free of contaminations from the frequency sidelobes of the highest amplitude sinusoids which have previously been identified and removed from the data. The process terminates when subtraction of the last iteration's sinusoid reduces net power by less than D dB (i.e. all remaining detect interferences fall below a predetermined power level).

The primary output of the process at step 432 is a list of the frequencies of all in-band sinusoids that contribute significant power to the net signal. It should be understood that the frequency list may include additional frequencies if desired, e.g., harmonics of 60 Hz known to appear in many transmitted signals.

At step 434, given that M significant sinusoids have been identified in the above-described process an M×N matrix of complex unit-amplitude sinusoid signals with the mth column (m=1, 2 . . . M) represents N samples of a sinusoid at one of the M frequencies is generated. Referring generally to steps 436 and 438, the process according to embodiments of the present invention adaptively cancels these sinusoids from the data stream that contains both signal and interference. A cancellation process using the M×N matrix will now be described for each subsequent N-sample data block, i.e., samples N+1 to 2N, 2N+1 to 3N, etc. The cancellation process scales each of the matrix columns with a unique complex weight where the M weights are jointly computed such that the weighted sum of the columns best fits the first N signal plus interference samples in the least means square sense. In one embodiment, for example, where the interference consists of a small number of sinusoids at well-separated frequencies, the individual columns of the sinusoid sample matrix can be adaptively weighted and subtracted from the data to simplify processing. As set forth above, in other embodiments a joint computation of the M adaptive weights may be preferable as it may provide better cancellation in dense interference environments. Referring to step 436, the fitting operation may be achieved by, for example, projecting the sinusoid sample matrix onto the N samples, and estimate M complex weights such that a best match is achieved. These weights are then applied to the columns of the sinusoid sample matrix. The weighted columns may be summed sample by sample.

With reference to step 438, this optimal vector representation of N sinusoid samples is then subtracted, sample by sample, from the first N signal plus interference samples, reducing and/or cancelling the sinusoidal interference from the first N samples. The cancellation process is then repeated for the N samples indexed from N+1 through 2N, the N samples indexed from 2N+1 through 3N, and so on, with each cancellation operation using the original M×N sinusoid sample matrix. In one embodiment, the adaptive weights are recomputed from data block to data block based on samples from each block.

Figure 9:
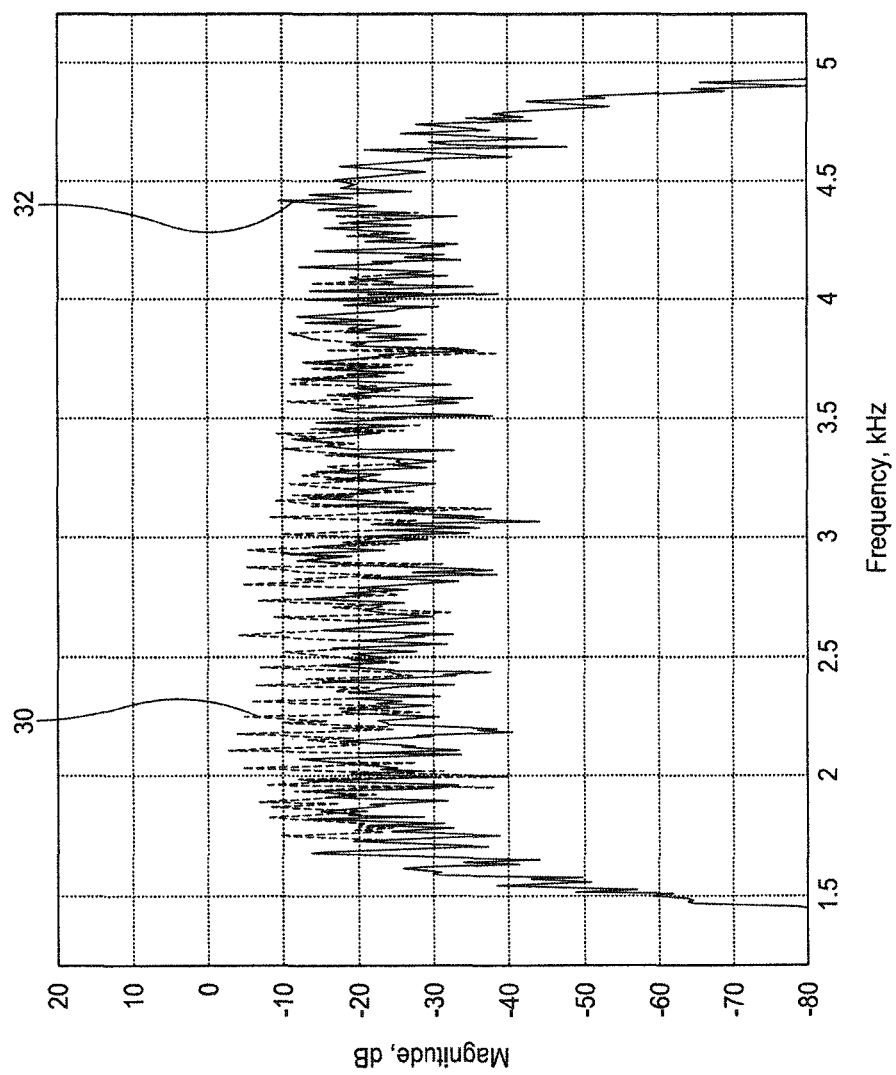
FIGS. 9 and 10 are graphs depicting sinusoidal interference in a signal's passband before and after the application of a process according to embodiments of the present invention.
Figure 10:
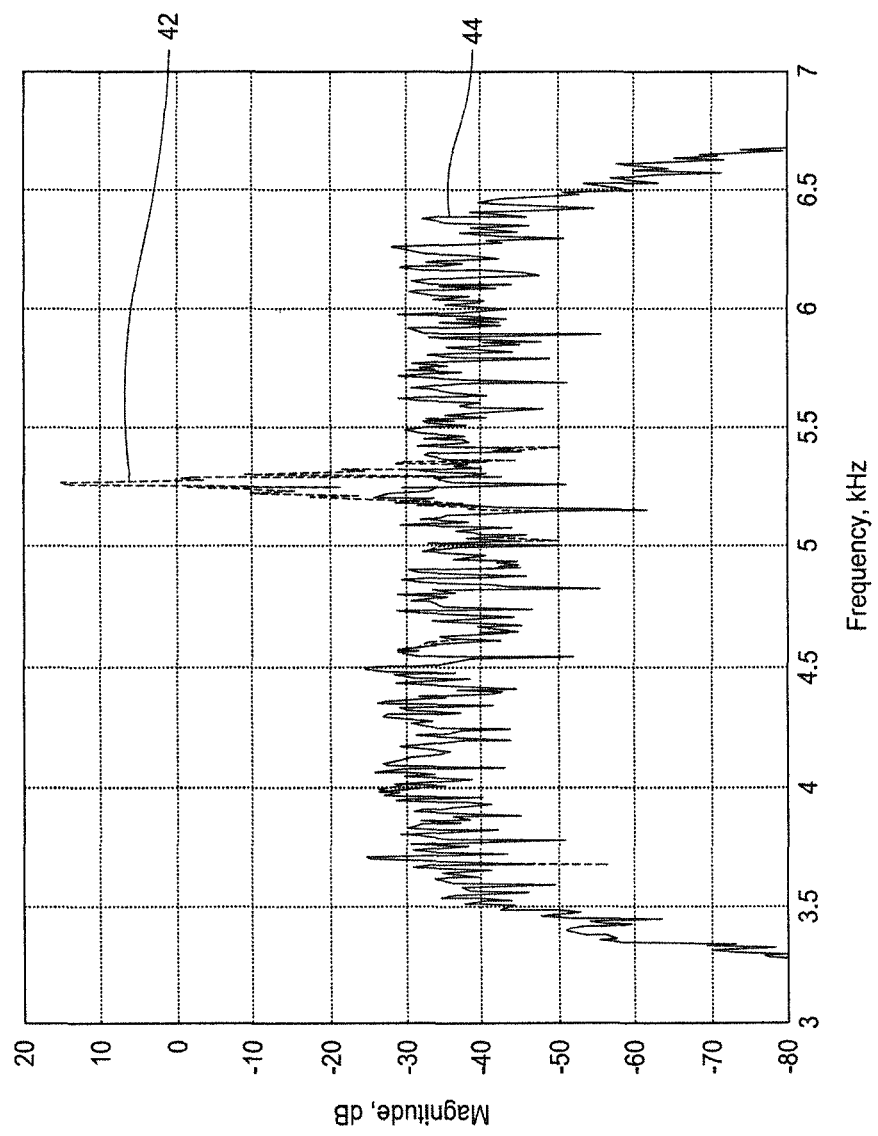

Referring generally to FIGS. 9 and 10, the results of the process according to embodiments of the present invention are shown with respect to the 3 kHz passband of an exemplary MCS. FIG. 9 provides a graph showing a signal spectrum's interference levels within a 3 kHz MCS signal passband before (30) and after (32) the cancellation of interfering sinusoids. Upon application of the above-described embodiments, a resultant signal 30 comprises significantly reduced interference levels compared to the original signal 32. Similarly, FIG. 10 shows the results of the process of the present invention as applied to a single sinusoidal interference 42. The embodiments of the present invention are operative to cancel the interference 42 resulting in signal 44. Active cancellation of the interfering sinusoids allows the system to effectively respond to interference environment that varies from site to site, from one antenna to its collocated companion antennas at a common site, and from one antenna orientation to another in a given location. The adaptability of the system also enables cancellation of a net interference signal whose characteristic parameters vary with time. These include the number of sinusoids, their frequencies, amplitudes and phase offsets from one another.

Figure 11:
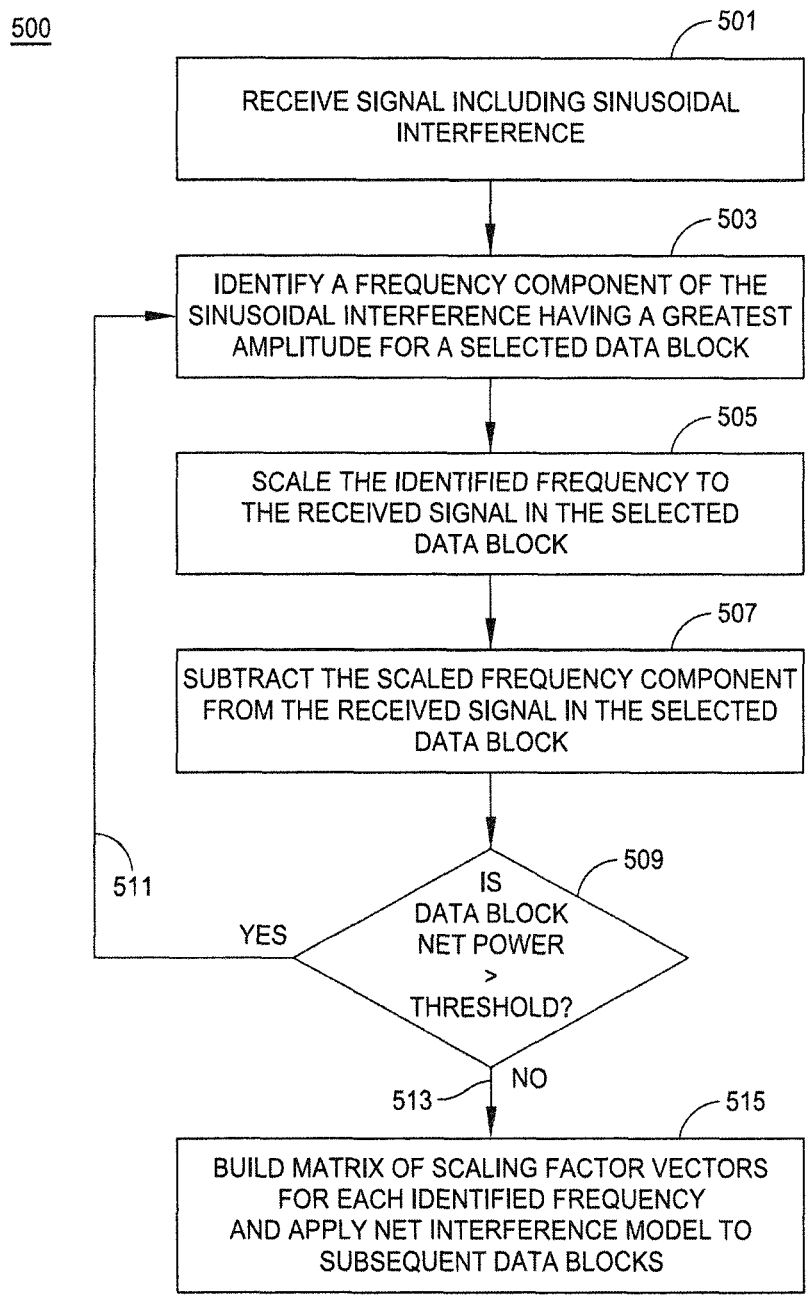
FIG. 11 is a process flow diagram of a training and cancellation process according to an embodiment of the present invention.

Referring now to FIG. 11, a process flow 500 of a training and cancellation procedure according to another embodiment is shown. With reference to step 501, a signal is received for processing. The signal carries information which is extracted from the signal and used for downstream processing. As the signal travels through one or more media from its origin to the receiving location, natural and manmade interference exists which overlays the signal and is received at the receiver along with the desired signal information. As set forth above with respect to FIG. 7, a series of samples are taken from the selected data block to determine sinusoidal sources of interference. An amplitude taper may be applied to the selected samples to reduce edge effects near the edges of the selected data block. A Fourier Transform is applied to convert the samples to the frequency domain. Once in the frequency domain, a sample having the greatest amplitude is identified. The frequency associated with the greatest is then identified in step 503. The interference signal detected at the identified frequency is scaled to the overall signals received in the selected data block in step 505. This scaled signal for the identified frequency is then subtracted from the overall signal received in the selected data block to remove the identified source of interference in step 507.

Referring generally to step 509, the net power of the data block is then determined and compared to a threshold. If the net power of the selected data block (which is known not to contain a desired signal) is above a predetermined threshold 511, the high net power level indicates that there are still components of the data block which are interference, causing net power increase in the data block. Remaining interference signals are iteratively removed by identifying the next largest amplitude (as the prior largest amplitude was subtracted from the data in step 507), scaling the resultant identified frequency (step 505), and subtracting that scaled component from the data block (step 507). If after subtracting a scaled indentified frequency component, the net power of the data block is below the threshold 513, it may be presumed that all of the significant interference components have been removed from the data block and the interference model is complete.

As set forth above, once all significant interference components have been identified, an M×N matrix may be constructed, where M is the number of frequency components identified and N is the number of scaled samples for each frequency component. The matrix may then applied to subsequent data blocks, including the data block containing the desired signal (step 515). The interference model constructed and stored in the matrix is used to cancel interference from the received signal without harming desired signal which may be a low power or low frequency signal. The process 500 may be repeated on a periodic basis to adaptively identify the current interference components affecting the received signal and adaptively remove the interference components without harming the desired signal.

The training and cancellation process according to any of the above-described embodiments may be applied independently to each of a system's receive antennas, as each may experience unique sinusoidal interference patterns. Further, while the above processes include computing the sinusoid sample matrix a single time for application to a received signal, it is envisioned that the matrix can be periodically recomputed and the cancellation process applied as described.

Figure 12:
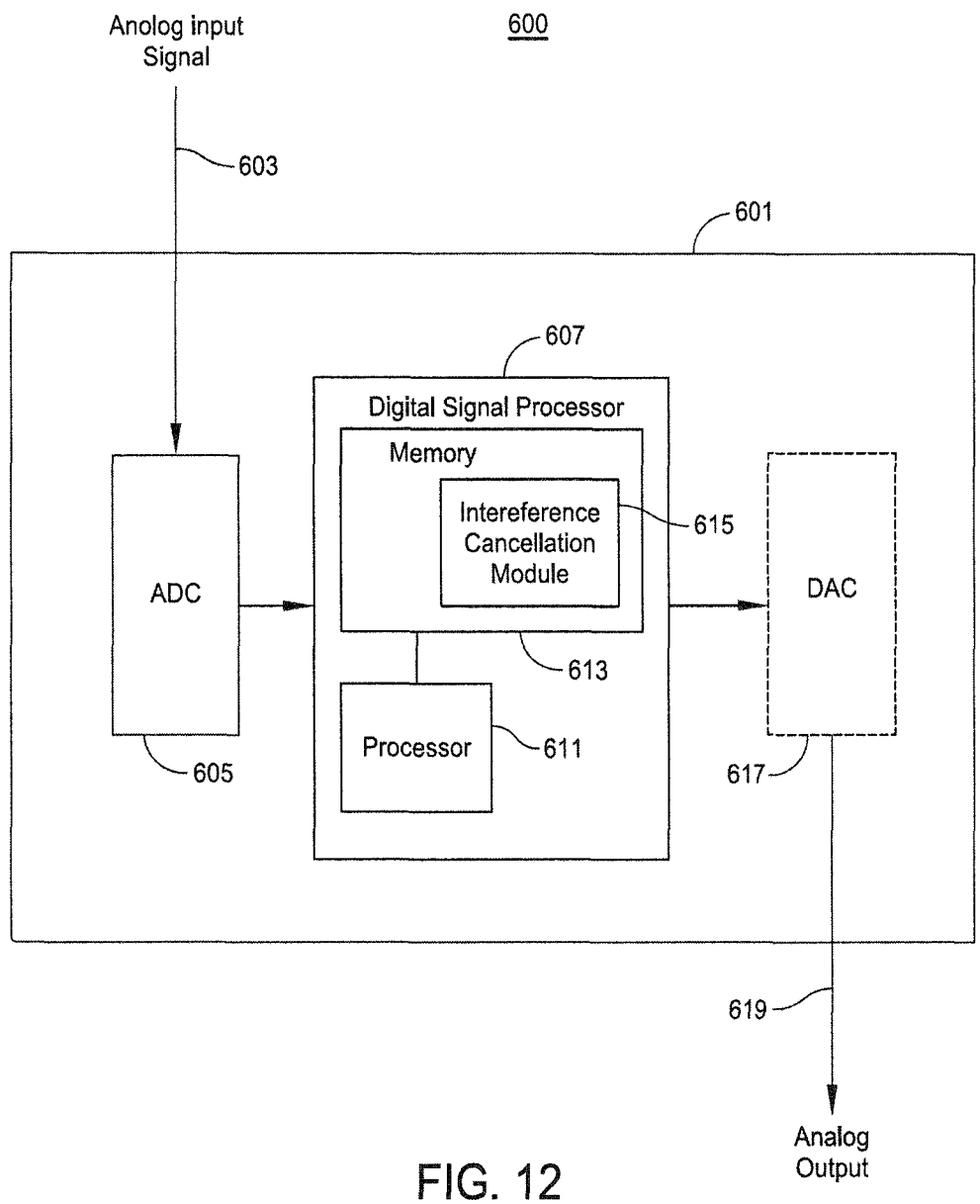
FIG. 12 is a block diagram of a digital signal processing system useful for performing the interference cancellation according to an exemplary embodiment.

Referring now to FIG. 12, a signal processing system 600 utilizing an adaptive interference cancellation process according to an exemplary embodiment is shown. An analog input signal 603 is transmitted through one or more media from an originating source to one or more receivers. For example, the analog input signal 603 may be a communication signal, such as a signal used in a magnetic communications system, or analog input signal may be some other radio wave signal, such as a radio detection and ranging (RADAR) signal or a biomedical imaging signal. Input signal 603 may travel through one or more media from its point of origin to a receiver 601 receiving input signal 603. For example, input signal 603 may be a magnetic communication signal used for communications within an underground application such as a mine. The signal may pass through media such as rock, water, concrete, wood or air between its transmission source and receiver 601. As input signal 603 passes through the media, the signal strength may be affected through signal attenuation or diffusion which decreases the signal strength at receiver 601. Other factors, both natural and manmade may contribute interference which further reduces the strength of input signal 603 at receiver 601. A substantial portion of these factors result in periodic or sinusoidal interference signals having varying amplitudes and phases which combine and overlay the desired transmitted signal. Interference may originate from sources, by way of example, such as rotating electrical equipment, electronic devices, or power lines.

Receiver 601 includes an analog to digital converter (ADC) 605 which receives and samples input analog signal 603 at various time intervals to provide a number of digitized samples representative of the signal level of input signal 603 at the times the samples are taken. The digital samples are then input to a digital signal processor 607. Digital signal processor 607 may have a processor 611 operatively coupled to a memory 613 through an appropriate data bus. Stored within memory 613 is an Interference Cancellation Module 615, which according to an exemplary embodiment, provides adaptive cancellation of the sinusoidal interference, overlaying the desired signal contained in input signal 603. The digitally processed signal includes the desired signal from analog input signal 603 less the identified interference components that were received in input signal 603 but removed. This processed digital signal may be passed on for additional downstream processing or analysis, or may be provided to a digital to analog converter (DAC) 617 for downstream processing in analog form. By way of example. downstream processing may be a communications receiver for reproducing a received communications signal or downstream processing may be a beam former used in a RADAR application for directing a receiver beam according to a received signal.

Interference Cancellation Module 615 provides adaptive interference cancellation based on the present conditions under which input signal 603 is transmitted and received. For example, a conventional interference cancellation device may utilize a notch filter for completely filtering out a block of frequencies which may be identified as containing interference. Such an approach introduces signal loss due to components of the desired signal which may have been present in the notch-filtered bandwidth. By building a model of identified interference components from a selected non-signal data block, interference signals that are identified and scaled to the overall signal may be used to provide a model for subsequent data blocks including the data block(s) containing the desired signal. The scaled interference components may be subtracted from the received signal, removing the interference without affecting the desired signal. Additionally, as conditions change between various receivers, or changing transmission conditions, the model may be periodically re-constructed to provide adaptive interference cancellation over time.

As set forth above with respect to FIGS. 1A-11, Interference Cancellation Module 615 operates by selecting a data block containing samples that do not contained a desired signal. The selected data block samples are converted from the time domain to the frequency domain through the application of, for example, a Fourier Transform. Once in the frequency domain, the frequency component having the largest amplitude is identified to a precision greater than the Fourier Transform using, for example, a quadratic fit to the amplitude of the greatest amplitude peak and its two adjacent neighbors. A unit-amplitude vector is constructed containing complex sinusoid signal samples at the identified frequency. The constructed vector is projected onto the original data set and a complex scale factor is determined that provides the best fit based on a least-mean-square algorithm. The scale factor is applied to the vector and the result is subtracted from the data block samples. Additional frequency components are identified and subtracted in a similar manner, until based on the subtraction of the scaled frequency components from the data block signal, the net power of the data block is below a given threshold. By subtracting each frequency component in an iterative fashion, the removal of each subsequent frequency component without the interference from the frequency sidelobes of the prior stronger frequency components is achieved. In one embodiment, the list of frequency components subtracted may include additional frequencies associated with other know interference frequencies, for example, harmonics at 60 Hz intervals from identified interference frequencies may be added to the frequency list. Based on M frequencies identified for removal, each associated with N samples, an M×N matrix is created containing unit amplitude complex sinusoidal samples for each of N samples for each M frequencies.

For each subsequent N sample data block, for example, samples N+1 to 2N, 2N+1 to 3N, etc., the sinusoid sample matrix is projected on the data block's N samples and M complex weights are estimated such that the weighted sum of the sinusoidal sample matrix best matches the data blocks samples on the basis of a least mean squares algorithm. The estimated complex weights are then applied to the columns of the sinusoid samples matrix, sample by sample and the resulting N-sample interference model is subtracted from the data block samples. Each subsequent N-sample data block is processed in a similar manner, with the M complex weights being re-computed at each data block. The frequency list containing the frequency elements containing identified interference may be periodically re-established to respond to possible changes in the received interference. Downstream processing is then performed on the interference cancelled data blocks.

Interference Cancellation Module 615 may be stored in memory 613 within signal processor 607. This illustration is provided by way of example only, and other embodiments for implementing the interference cancellation process described herein may be contemplated by one of skill in the pertinent art without departing from the intended scope of this disclosure. For example, the process has been explained by way of example, to include memory containing instructions, the instructions when executed by a processor, cause the steps of a method for cancelling sinusoidal interference during signal processing to be performed. It is understood that the process of interference cancellation may also be performed in hardware, for example in a field programmable gate array (FPGA) or a complex programmable logic device (CPLD). Thus, the entire process or any part thereof, may be performed in hardware, software or any combination of hardware and/or software. Software may be embodied in a non-transitory machine readable medium upon which software instructions may be stored, the stored instructions when executed by a processor cause the processor to perform the steps of a method of cancelling sinusoidal interference for signal processing. Any suitable machine readable medium may be used, including but not limited to, magnetic or optical disks, for example CD-ROM, DVD-ROM, floppy disks and the like. Other media also fall within the intended scope of this disclosure, for example, dynamic random access memory (DRAM), random access memory (RAM), read-only memory (ROM) or flash memory may also be used.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A method of canceling sinusoidal interference from a signal to be processed, the method comprising the steps of:
   identifying sinusoidal interference from a received signal;
   generating a model of the identified sinusoidal interference;
   matching the model to the identified sinusoidal interference using a fitting operation, and
   cancelling the identified sinusoidal interference by subtracting the matched model from the identified sinusoidal interference,
   wherein the step of generating a model comprises the step of identifying sinusoidal interferences from a block of time-domain data samples of the received signal that are known to be interference-only.

2. The method of claim 1, further comprising a step of applying an amplitude taper to the sinusoidal interference.

3. The method of claim 2, further comprising a step of applying a Fourier Transform to the sampled signal.

4. The method of claim 1, further comprising a step of identifying a frequency of the sinusoidal interference.

5. The method of claim 4, further comprising a step of identifying a peak amplitude of the sinusoidal interference.

6. The method of claim 5, wherein the frequency and the amplitude are identified using a quadratic fit to amplitudes of the identified peak and to peaks adjacent thereto.

7. The method of claim 4, further comprising generating a vector containing a number of samples of a complex unit-amplitude sinusoid at the identified frequency.

8. The method of claim 7, wherein scaled sinusoid samples are generated by scaling the vector in amplitude and phase to match the sampled complex unit-amplitude sinusoids.

9. The method of claim 8, wherein the scaling is achieved using a least-mean-square process.

10. The method of claim 8, wherein the scaled sinusoid samples are subtracted from the vector of samples of the complex unit-amplitude sinusoids.

11. The method of claim 10, further comprising a step of estimating a net power of the signal resulting from the subtracting.

12. The method of claim 11, further comprising a step of recording the identified frequency if the net power is at least a predetermined level less than an original power.

13. The method of claim 12, wherein the process is repeated until the subtraction of the scaled sinusoid samples reduces net power by less than a predetermined amount.

14. The method of claim 1, wherein the step of generating a model of the sinusoid interference comprises generating a matrix of complex unit-amplitude sinusoid signals.

15. The method of claim 14, wherein the step of canceling the sinusoidal interference comprises scaling the matrix with a complex weight, wherein the weight comprises a vector of a number of complex-valued numbers and is computed such that the sum of columns of the matrix are fit to the identified sinusoidal interference.

16. The method of claim 15, wherein the vector is subtracted sample by sample from the identified sinusoidal interference, cancelling the identified sinusoidal interference.

17. The method of claim 16, wherein the complex weight is recomputed for each data block.

18. The method of claim 1, wherein the step of generating said model by identifying sinusoidal interferences from a block of time-domain data samples that are known to be interference-only, further comprises:
   a) determining a frequency of the interference sinusoid having a largest amplitude and cancelling that interference sinusoid from the block of time-domain interference-only data samples to generate a modified block of time-domain interference-only data samples;
   b) determining a net power of the modified block of time-domain interference-only data samples;
   c) storing the determined frequency of the interference sinusoid in a list;
   d) comparing the determined net power with a threshold value;
   e) repeating steps a) through d) for each frequency of interference sinusoid having the next largest amplitude until said step d) comparison yields said determined net power being less than the threshold value; and
   f) applying the list of determined frequencies of the interference sinusoids to generate said model.

19. The method of claim 18, further comprising:
   supplementing said list of determined frequencies with additional frequencies to remove additional interferences from one or more known sources.

20. A signal processing system for removing sinusoidal interference from a signal to be processed, the system comprising:
   an antenna for receiving an analog input signal;
   an analog to digital converter (ADC) coupled to the antenna for generating digital samples of the received input signal; and
   a digital signal processor coupled to the ADC configured to process the digital samples and cancel sinusoidal interference contained in the digital samples,
   wherein the digital signal processors comprises a set of instructions, the instructions when executed by a processor causing the processor to identify sinusoidal interference received by a receiver; generate a model of the identified sinusoidal interference, match the model to the identified sinusoidal interference using a fitting operation, and cancel the identified sinusoidal interference by subtracting the matched model from the identified sinusoidal interference,
   wherein the step of generating a model of the identified sinusoidal interference comprises the step of identifying sinusoidal interferences from a block of time-domain data samples of the received input signal that are known to be interference-only.

* * * * *